Dec. 19, 1967   F. AUBERY   3,359,023
AUTOMATIC MACHINE FOR BINDING CASES AND PACKAGES
Filed Sept. 15, 1965   8 Sheets-Sheet 1

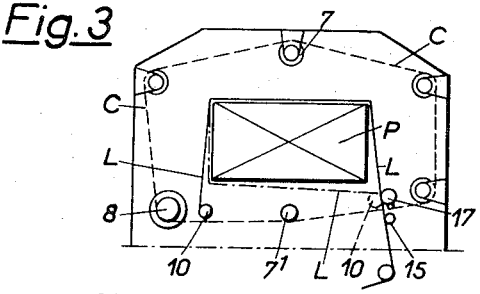
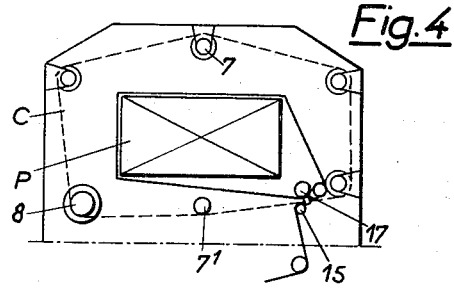
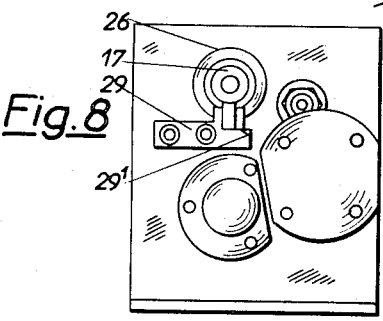
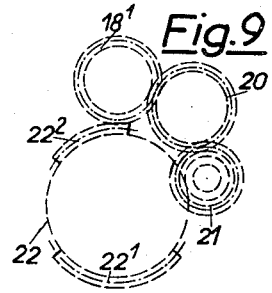
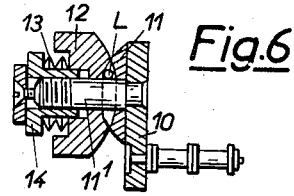
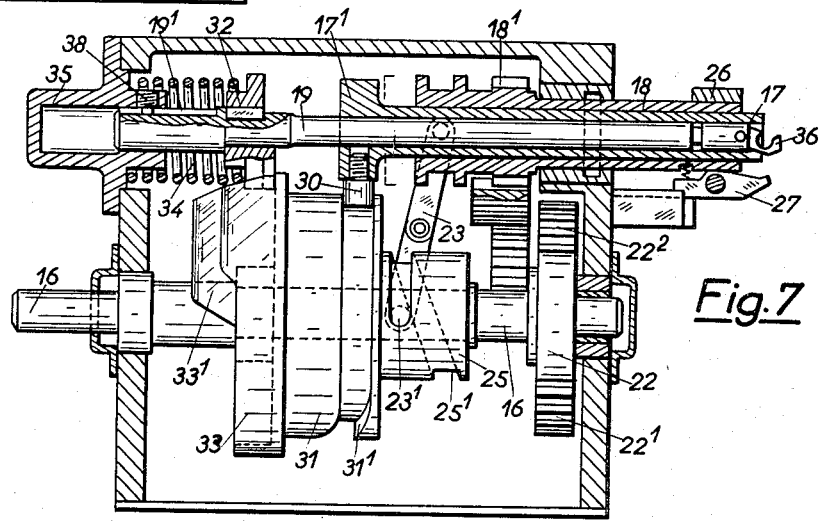
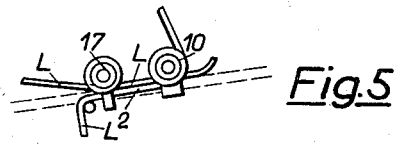

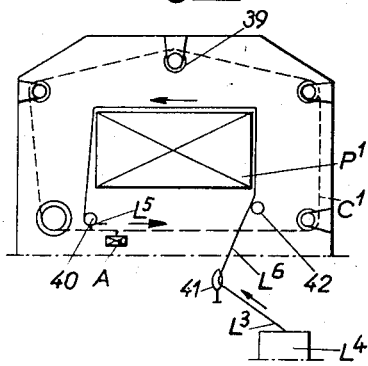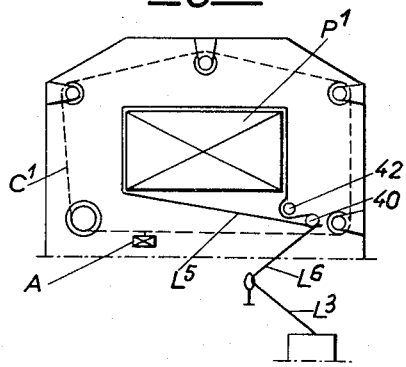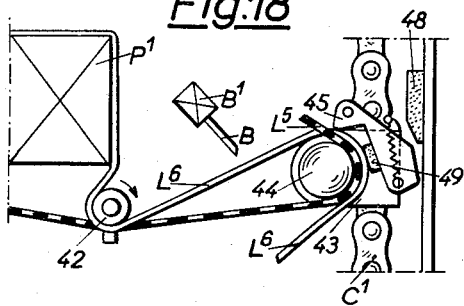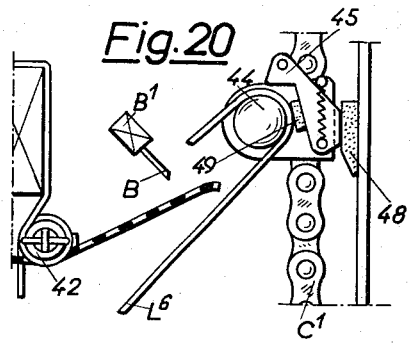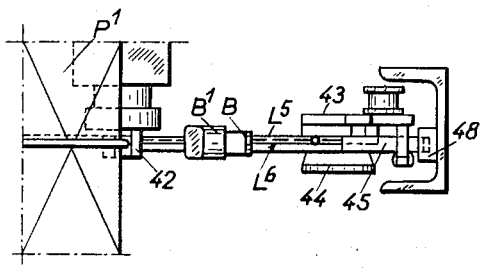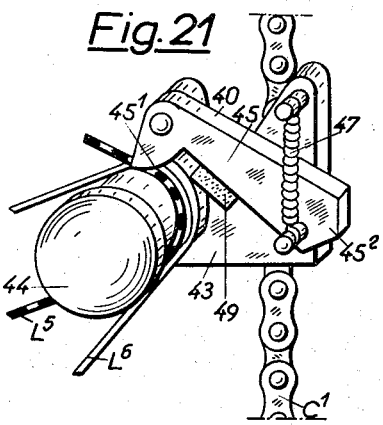

Dec. 19, 1967  F. AUBERY  3,359,023
AUTOMATIC MACHINE FOR BINDING CASES AND PACKAGES
Filed Sept. 15, 1965  8 Sheets-Sheet 5

Dec. 19, 1967  F. AUBERY  3,359,023
AUTOMATIC MACHINE FOR BINDING CASES AND PACKAGES
Filed Sept. 15, 1965  8 Sheets-Sheet 6
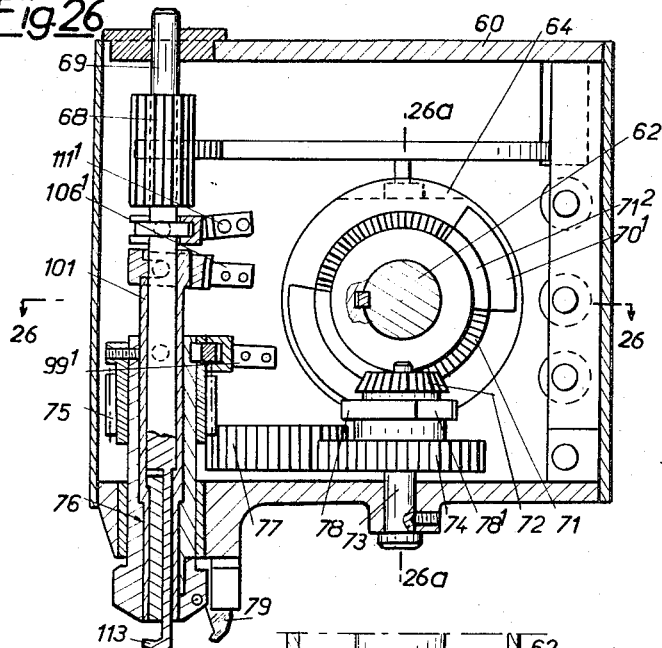
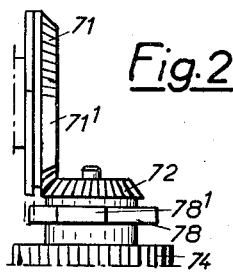
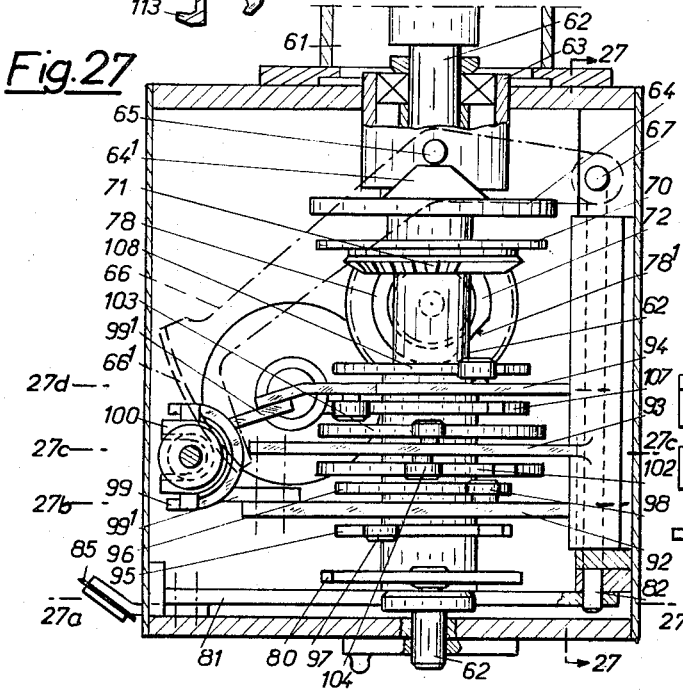
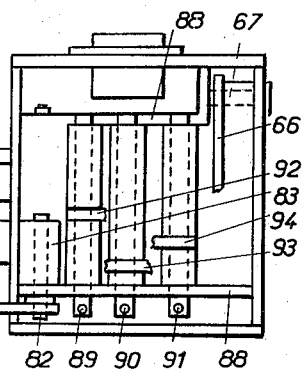

Dec. 19, 1967  F. AUBERY  3,359,023
AUTOMATIC MACHINE FOR BINDING CASES AND PACKAGES
Filed Sept. 15, 1965  8 Sheets-Sheet 7

Dec. 19, 1967  F. AUBERY  3,359,023

AUTOMATIC MACHINE FOR BINDING CASES AND PACKAGES

Filed Sept. 15, 1965  8 Sheets-Sheet 8

United States Patent Office 3,359,023
Patented Dec. 19, 1967

3,359,023
AUTOMATIC MACHINE FOR BINDING CASES AND PACKAGES
Francois Aubery, 18 Rue Colbert, Valence, France
Filed Sept. 15, 1965, Ser. No. 487,419
Claims priority, application France, Sept. 22, 1964, 9,009
11 Claims. (Cl. 289—2)

ABSTRACT OF THE DISCLOSURE

Apparatus having a tensioned endless chain conveyor with grippers thereon for engaging a free end of an elongated binder from a supply thereof and wrapping the elongated binder around a package while the chain conveyor is guided in guide means, a severing device being provided to sever a length of elongated binder from the supply thereof, the severed length of elongated binder being knotted by a knotter device subsequent to its being wrapped around the package.

---

The present invention relates to an automatic machine for binding cases and packages with an elongated binder.

According to the present invention there is provided apparatus for binding packages with an elongated binder, said apparatus comprising:
  a frame,
  support means for supporting packages to be bound,
  means for engaging a length of elongated binder,
  drive means for driving said binder engaging means around a package located on said support means,
  guide means mounted on said frame for guiding said binder engaging means around the package, and
  a knotting device operatively associated with said binder engaging means for knotting the binder subsequently to its guiding around the package.

For a better understanding of the invention, and to show how the same may be carried into effect, reference will now be made, by way of example to the accompanying drawings, wherein:

FIG. 3 is a diagrammatic front elevation, similar to FIG. 1 but drawn to a smaller scale, showing a different operative position of the apparatus;

FIG. 4 is a view similar to FIG. 3 showing a further operative position;

FIG. 5 is an elevational view, drawn to a larger scale, of a detail of FIG. 4;

FIG. 6 is a longitudinal section, drawn to a larger scale, through a detail of FIG. 1;

FIG. 7 is a longitudinal section through a further detail of FIG. 1;

FIG. 8 is a front elevational view corresponding to FIG. 7 drawn to a smaller scale;

FIG. 9 is a diagrammatic end elevation corresponding to FIG. 7, showing the interrelationship of some parts;

FIG. 16 is a view similar to FIGS. 3 and 4 showing one operative position of a further embodiment;

FIG. 17 is a view similar to FIG. 16 showing a further operative position of the apparatus illustrated therein;

FIG. 18 is an elevational view, of a detail of FIG. 17, drawn to a larger scale;

FIG. 19 is a plan view corresponding to FIG. 18;

FIG. 20 is a view similar to FIG. 18, showing a further working position;

FIG. 21 is a perspective view, drawn to a larger scale, corresponding to FIG. 18;

FIG. 26 is a longitudinal sectional view of a detail of a further embodiment;

FIG. 27 is a sectional elevation taken on the line 26—26 of FIG. 26;

FIG. 28 is a sectional plan view taken on the line 27—27 of FIG. 27;

FIG. 29 is a fragmentary plan view taken through the line 26a—26a of FIG. 26;

Figure 1:
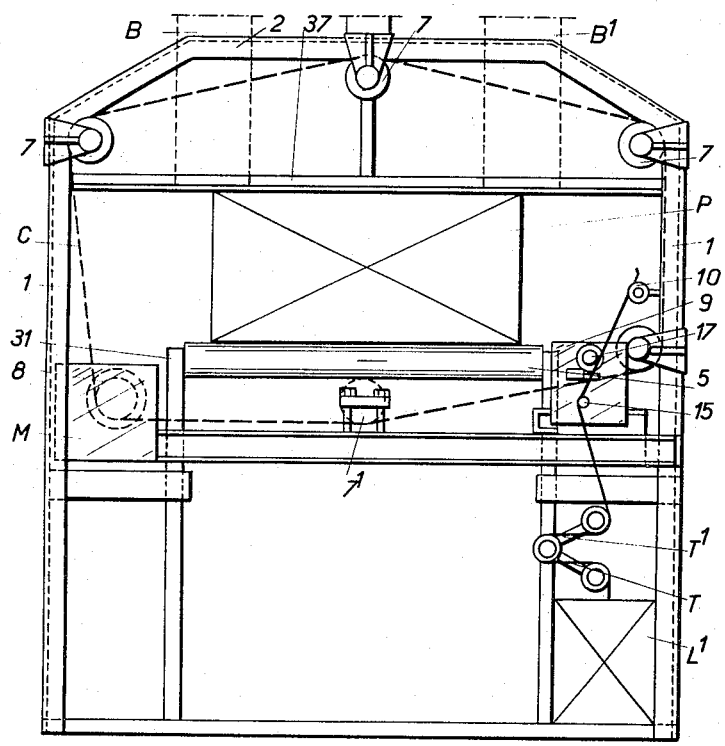
FIG. 1 is a front elevation of one embodiment of the present invention.
Figure 2:
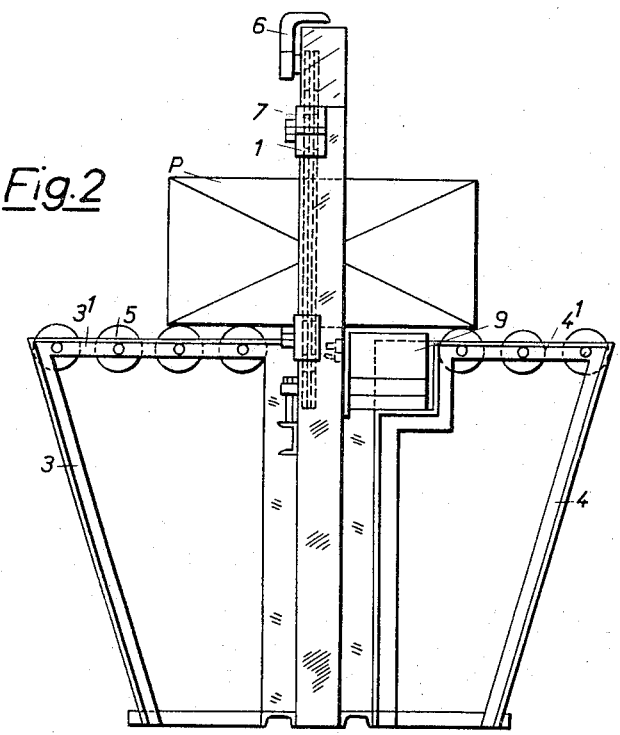
FIG. 2 is a side elevation corresponding to FIG. 1.

In the drawings there is shown an automatic machine for binding cases and packages which comprises a frame 1 formed of section-iron uprights which are transversely arranged and connected at their upper ends by a cross-member 2. This frame, forming a bridge-like structure, is connected on each side to lateral supports 3 and 4, which are also made of angle-iron elements. The supports 3 and 4 at their top, are formed with lateral side members 3¹ and 4¹ which are disposed in a horizontal plane at a predetermined height above the base of the machine. Supporting rollers 5 are mounted for free, or possibly driven, rotation on the lateral side members 3¹ and 4¹. These transversely disposed rollers 5 thus constitute a supporting table for receiving a package or packages P which are to be bound.

The upper portion of the frame 1, 2 enables square supports 6 to be fixed around its periphery for holding freely rotatable pinions or pulleys 7. Below the rollers 5, and between the frame 1, 2 and lateral supports 3 and 4 there is mounted a motor M, which has a driving pinion 8 disposed in the same plane as the pinion 7.

An endless chain C, guided by the pinions 7 and 8 and by a tensioning pinion $7^1$, is disposed in loop formation, and permits the securing of a guiding gripper device 10 for the string, twine or other binder L which is to extend around the package P. This gripper device 10 (see FIG. 6) comprises a supporting washer 11, which is mounted on a shaft $11^1$, and a movable disc 12 which is also mounted on the shaft $11^1$ and which is acted upon by springs 13, the pressure of which is dependent upon a nut 14 which is in screw threaded engagement with an end portion of the shaft $11^1$ remote from the washer 11.

It is necessary to consider that the contacting surfaces of the movable disc 12 and the washer 11 are inversely sloped and rounded peripherally so as to permit engagement and holding of the binder L.

The binder L is unwound from the ball $L^1$ (FIG. 1) mounted at the base of the frame 1, 2 and is engaged by rollers which are mounted on tensioning arms T, $T^1$ which are pivotally mounted on one of the lateral supports 3, 4. Above the arms T, $T^1$, the binder L is guided by a fixed finger 15 so as to be represented opposite the gripper device 10.

When a package P is placed on the rollers 5, it will be seen that rotation of the endless chain C drives the binder L around the periphery of the package P so as to encircle it, as shown in FIG. 3. After four surfaces of the package have thus been encircled, the gripper device 10, which always holds the end of the binder L, also engages a length of binder $L^2$ (FIG. 5) coming directly from the ball $L^1$ and carries it along a loose path as illustrated in FIGS. 4 and 5. A sleeve 17 of an automatic knotting unit 9 disposed opposite advances transversely above the lengths L and $L^2$ of the binder in order to permit their position to be maintained and consequently the knotting thereof.

The automatic knotting unit 9, which is disposed in the clearance between the lateral supports 3, 4 and the frame 1, 2 on the side opposite to the motor M, comprises a rectangular parallelepipedic casing in which there is longitudinally disposed a rotatable shaft 16 upon which control cams are mounted. Above the shaft 16 there is arranged a rotatable knotter device 18 which extends through the external transverse wall of the casing. The sleeve 17 is mounted within a bore of the knotter device 18 and is arranged for free sliding movement therein. A longitudinally movable spindle 19 is slidable axially in the bore of the sleeve 17 and is arranged to be guided longitudinally at its rear end by means of a pin 38 which engages a groove or keyway $19^1$ formed in the external surface of said rear end of the spindle 19. The groove $19^1$ may be helical in order to permit the rotation of the spindle 19 when the latter is displaced longitudinally. The rotatable knotter 18 which is itself in the form of a sleeve is formed with peripheral teeth on its rear portion in order to form a pinion $18^1$ which meshes, by means of intermediate wheels 20 and 21 (FIG. 9), with a pinion 22 keyed on the shaft 16. It is to be borne in mind that one of the wheels 20 and 21 is mounted on a non-return device, in the manner of a free-wheel, in order to permit its rotation in only one direction.

The pinion 22 is formed on its periphery with two toothed arcuate sections $22^1$ and $22^2$ which are diametrically opposite and of unequal circumferential length. Taking into account the reduction ratio given by the diameters of the pinions, the toothed section $22^1$ permits the knotting device 18 to rotate through one and a quarter revolutions, while the selection $22^2$ permits, after a period of immobilisation the complementary rotation of the knotting device 18 by three quarters of a revolution.

As well as this rotational displacement, the knotting device 18 is displaceable longitudinally by means of a pivoting fork 23 which is articulated on a shaft 24. The fork 23 is driven by the engagement of a finger or projection $23^1$ thereof in a helical groove $25^1$ of a cylindrical cam 25 mounted on the shaft 16.

Figure 11:
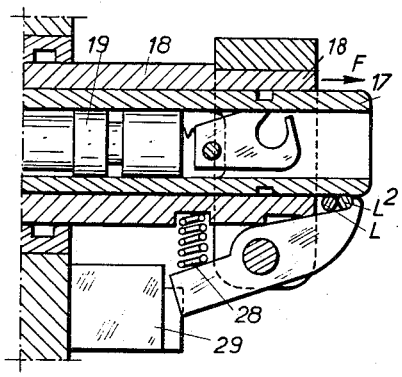
FIG. 11 is a view similar to FIG. 10 showing a further working position.

The knotting device 18 is provided at its outer forward end with a head 26 in the form of a collar which is formed with a flange upon which a gripper device 27 is pivotally mounted. The gripper device 27 is constantly urged into a closing position by a helical spring 28 (FIG. 11). A bearing block 29, which is formed with a sloping surface $29^1$ (FIG. 8), ensures that the gripper device 27 is held in its opening position when the knotting device 18 is retracted.

The sleeve 17 of tubular section is slidable freely in the bore of the knotting device 18 and is formed at its rear end with a shoulder $17^1$ which is mounted on a roller 30 which engages a groove $31^1$ of a cam 31 which is also mounted on the shaft 16. It will be seen that by this means the sleeve 17 may be given longitudinal movement.

The spindle 19, which is slidable in the bore of the sleeve 17 at a constant angular position (or with a rotation provided by the pin 38), has a flange element 32 secured thereto, which element bears against a sloping surface $33^1$ of a cam 33 which is also mounted on shaft 16. A helical spring 34 is interposed between the flange 32 and a centering ring 35. The spring 34 urges the element 32 into constant engagement with the sloping surface $33^1$.

A hook 36 is pivotally mounted on the outer forward end of the spindle 19, the hook being retractable inside the sleeve 17 and yet also able to project externally thereof. The hook 36 is also capable of rotational movement about the axis of the member 19.

Having thus described this automatic knotting unit, it is expedient to explain the operation thereof.

Figure 10:
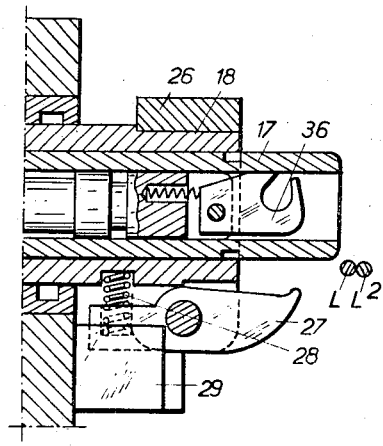
FIG. 10 is a fragmentary sectional view, drawn to a larger scale, and showing a portion of the apparatus illustrated in FIG. 7 in a different working position.

As illustrated in FIGS. 10 and 11, the lengths L and $L^2$ of the binder are brought into contact with one another, and the sleeve 17 is advanced in order to be positioned for engagement thereof. After engagement, the rotatable knotting device 18, controlled by the circular cam 25 and the pivoting fork 23, advances in the direction indicated by the arrow F (FIG. 11), the gripper device 27 being released from engagement by the bearing block 29 so that, under the action of the helical spring 28, the claw-shaped end portion of the gripper device 27 is closed on the lengths L and $L^2$ in order to hold them gripped against the periphery of the sleeve 17.

Figure 12:
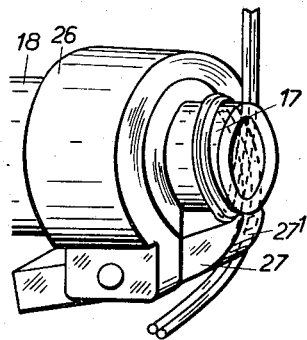
FIGS. 12 and 13 are perspective views of the portion of the apparatus illustrated in FIG. 10.

After this phase of holding the lengths L and $L^2$, the pinion 22 meshes with the intermediate wheels 20 and 21 and the knotting device 18 is caused to rotate through one and a quarter revolutions. During this rotation, the lengths L and $L^2$ are driven simultaneously by the gripper device 27 so as to be wound about the sleeve 17 and to be crossed before the end of the rotation, as illustrated by FIG. 12.

Figure 13:
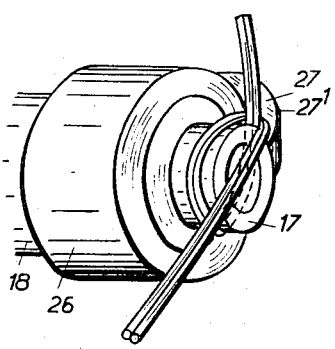

At the end of the travel, the unwound external sections of the lengths L and $L^2$ disposed upstream of the sleeve 17 bear against the rounded end forming a sloping surface $27^1$ of the gripper device 27 and are, by this means moved, by sliding over the surface $27^1$, to a position where they bear against the forward end face of the sleeve 17, as illustrated in FIG. 13.

Figure 14:
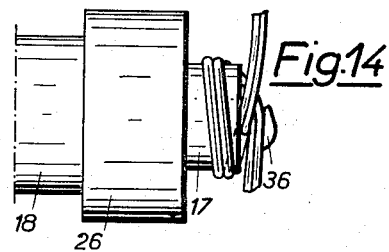
FIG. 14 is a side elevation corresponding to FIG. 12 or 13, shown in a different operative position.
Figure 22:
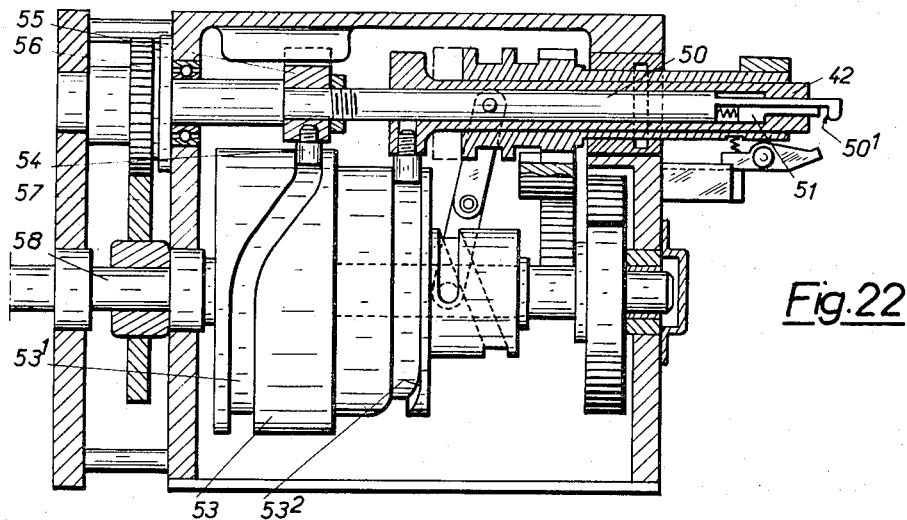
FIG. 22 is a longitudinal section, similar to FIG. 7, through a detail of the embodiment of FIG. 16.
Figure 24:
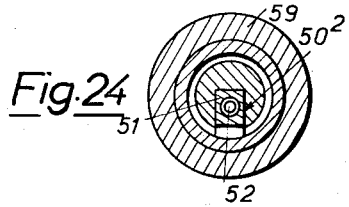
FIG. 24 is a section taken on the line 23—23 of FIG. 23.
Figure 23:
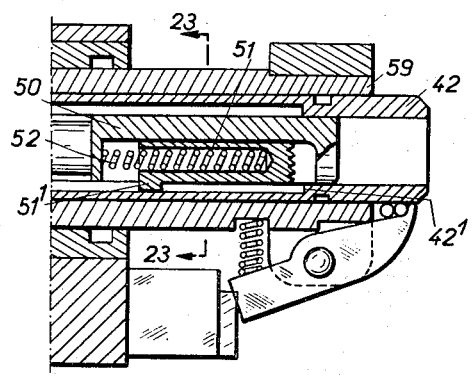
FIG. 23 is a fragmentary sectional view, drawn to a larger scale, and showing a portion of the apparatus illustrated in FIG. 22 in a different working position.

The member 19 is then urged longitudinally by the cam 33, and the hook 36 emerges from the bore of the sleeve 17 in order to grip the portions of the lengths L and $L^2$, which are disposed across the said bore of the sleeve—see FIG. 14.

Figure 15:
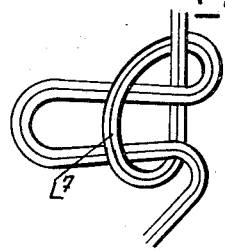
FIG. 15 is a diagrammatic view showing a knot which may be made by the apparatus illustrated in FIGS. 10 to 14.

Retraction of the member 19 and the hook 36, whether combined with a rotational movement or not, causes a loop $L^1$, of a knot to be formed, as illustrated in FIG. 15. After this formation, the sleeve 17 is retracted in order to permit the ejection of the knot.

The rotatable knotting device 18 is also retracted and continues its rotation (for three quarters of a revolution) in order to bring, at the end of its travel, the gripper device 27 opposite the sloping surface 29¹ of the bearing block 29 so as to cause the opening and locking in position thereof.

It is quite obvious that this knotting unit can be adapted to any type of machine. The automatic binding machine described above may also be provided with a suitably guided bar 37 (FIG. 1) which is given a vertical movement in order to bear on the upper face of the package P. This bar 37 which forms a press and is controlled by a jack or any other means, may also be provided with distributor blocks B and B¹ for the positioning of panels of cardboard or other material, designed to protect the corners of the package P. Mechanical means can be provided for guiding the said panels onto the said edges.

Finally, it is also possible for several machines to be coupled together by juxtaposition of the bridge-like members 1, 2 and working them alternately by means of a travelling belt. This arrangement permits multiple uses.

In a modified constructional form which is illustrated in FIGS. 16 to 25 section-member supports, designed to hold guiding pinions or pulleys 39 (corresponding to the pulley 17) of the endless chain C¹ (corresponding to the chain C), are fixed on the periphery of the frame 1, 2. The chain C¹ is driven by a motor (not shown) and is provided with an automatically locking gripper device 40 which engages a length of string or other binder L³ designed to enclose the package P¹ previously placed on the supporting rollers (not shown in FIGS. 16 to 18).

The binder L³, moved by the chain C¹, is unwound from a ball L⁴ (corresponding to the ball L⁹) located at the base of the frame, in order then to be guided at an angle through an eye 41 (FIG. 16) so as necessarily to be presented to one side of the package P¹ and substantially tangentially to a sleeve 42 of a knotting unit. Rotation of the endless chain C¹ drives the binder L³ around the periphery of the package P¹, as illustrated in FIG. 16.

The automatic locking gripper device 40, according to this modified embodiment, comprises a plate 43 (FIGS. 18, 19 and 21) which is fixed laterally on the chain C¹ and on one side of which is mounted a bearing bracket 44 of generally frusto-conical shape. The free end of the binder L³ is wound onto the bracket 44. An automatic locking lever 45 is pivoted on a shaft 46 (FIG. 21) which is mounted fast with the plate 43. The lever 45 is formed with a crank-like projection 45¹ which acts with a gripping action on the periphery of the binder L³, previously engaged over the bearing bracket 44, so as to ensure a progressive automatic locking under the effect of the traction exerted on the said binder L³. The lever 45 is urged into its position in engagement with the binder L³ by means of a coiled spring 47, which is secured at one end to an end portion of the lever 45 remote from the pivotal mounting thereof. The said end portion of the lever 45 is formed with an end face 45² which is arranged to co-operate with a cam 48 (FIGS. 18, 19 and 20) fixed inside one of the vertical uprights of the frame 1, 2 and intended to ensure the control of the release of the said lever 45. At the end of its travel in wrapping the package P¹, the chain C¹, by means of a finger acting on a micro-switch or other device A, controls the connection into the electric circuit of the knotting unit, which thus has its sleeve 42 in a position traversing the path of travel of the binder. On the otherhand, while continuing its rotation, the gripper device 40 which holds the free end L⁵ of the binder (shown with spaced black portions) is brought by its bracket 44 facing the length L⁶ (held by the sleeve 42), so as to drive it in forming a loop.

The lengths L⁵ and L⁶ are thus bearing on the sleeve 42 for the knotting operation, as indicated in the previous embodiment.

It must also be noted that upon completion of this movement of the automatic locking device 40, which is displaced vertically, the end face 45² of the lever 45 is brought into contact with the cam 48, which causes the lever to pivot about the shaft 46 so as to free the lengths L⁵ and L⁶ wound around the bracket 44. This release permits the return sliding movement of the lengths L⁵ and L⁶ at the time of knotting. It is to be noted that, for this purpose, a block 49 of flexible material, or alternatively a spring fixed on the inner face of the lever 45, exerts a resilient bearing effect on the lengths L⁵ and L⁶ so as to avoid the detachment thereof from the bracket 44.

With the return movement of the lengths due to the formation of the knot, a cutting blade B, controlled by an electromagnet B¹ or the like, acts on the length L⁶ to cut it, while the length L⁵ is released from the gripper device by a sliding movement. As illustrated in FIG. 20, after the knotting operation, only the length L⁶ remains on the gripper device 40, which is automatically held for ensuring a fresh wrapping of the package P¹.

This arrangement thus avoids any new engagement of the binder.

Figure 25:
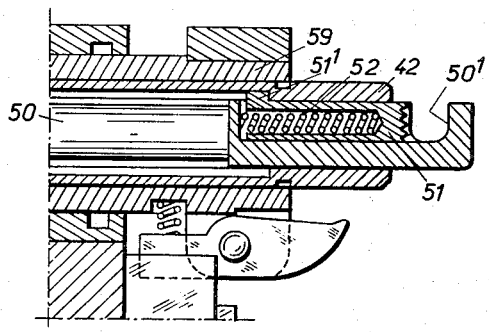
FIG. 25 is a view similar to FIG. 23, showing further operative position.
Figure 30:
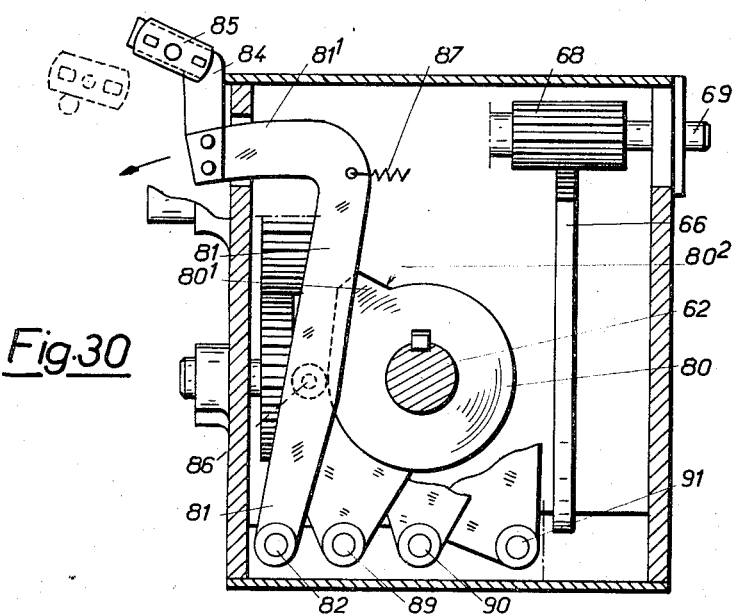
FIG. 30 is a section taken on the line 27a—27a of FIG. 27.
Figure 31:
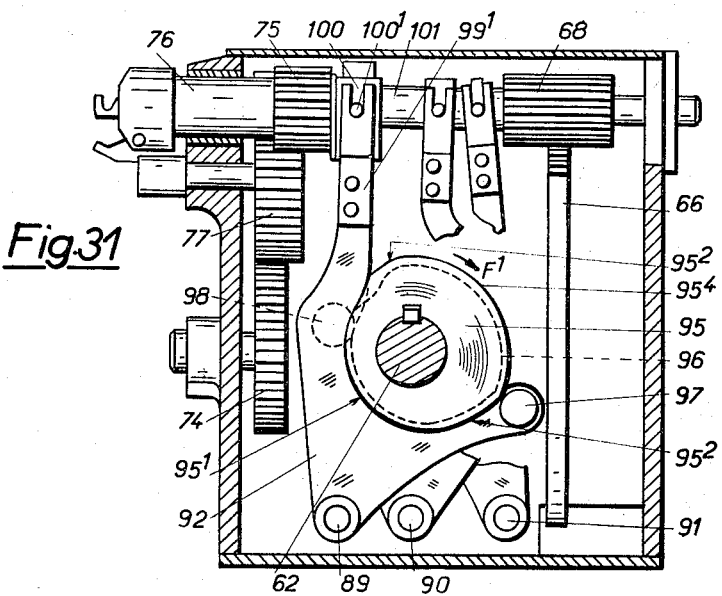
FIG. 31 is a section taken on the line 27b—27b of FIG. 27.
Figure 32:
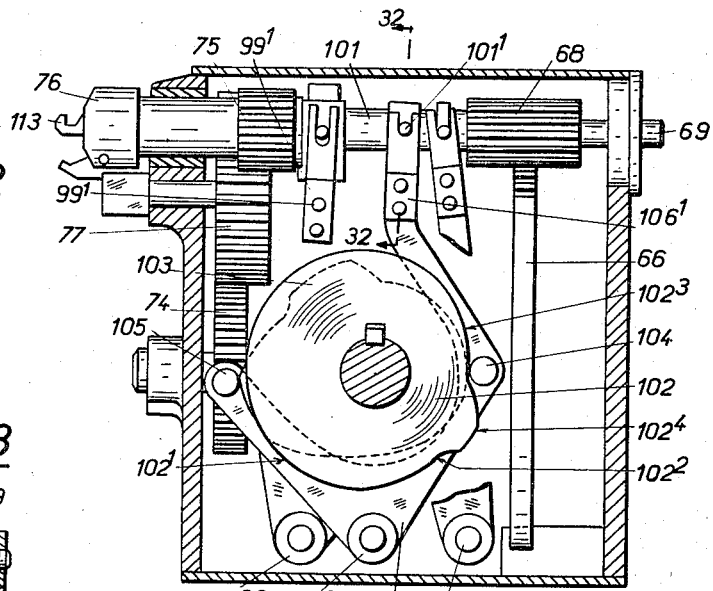
FIG. 32 is a section taken on the line 27c—27c of FIG. 27.
Figure 33:
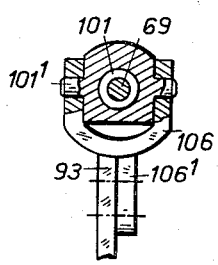
FIG. 33 is a sectional view, taken on the line 32—32, showing a detail of FIG. 32.

The knotting unit is illustrated in FIGS. 22 to 25, and comprises a movable spindle 50 which is arranged for sliding movement inside the sleeve 42, and which has at its forward end an opening 50¹ forming a hook. The spindle 50 is also formed with a longitudinal groove 50² (FIG. 24) in which is mounted for sliding movement therein a movable jaw 51, notched on its front face, and constantly urged by a coiled spring 52 into a locking position against the lengths or ends of the binder which are arranged, in operation, in the opening 50¹. This movable jaw 51 is also formed with a stop portion 51¹ which co-operates with a shoulder 42¹ formed inside the sleeve 42. A circular cam 53, mounted on a cam shaft 58 and formed with a helical groove 53¹ is arranged to advance and retract the spindle 50. A roller 54, fixed on a sleeve 55 which is mounted to rotate freely on the said spindle, is arranged to co-operate with the groove 53¹. Because of this arrangement, when the movable spindle 50 is advanced by means of the cam 53, while being guided longitudinally, the shoulder 42¹ abuts longitudinally against the stop portion 51¹ of the movable jaw 51 at the end of the travel, as shown in FIG. 25, so as to permit in this way the opening of the hook for the engagement of the lengths of binder therein.

At the time of return of the spindle 50 for the knotting operation, the movable jaw 51, urged by the coiled spring 52 ensures by means of its notched front portion the locking of the said folded lengths of the binder, while avoiding any sliding movement and causing the pulling thereof.

It must also be noted that, according to this embodiment, the movable spindle 50 is mounted to turn through 180° by means of a toothed wheel 56 keyed for sliding movement relative thereto on its rear end in order to co-operate with a pinion 57 mounted on the cam shaft 58.

By means of this arrangement, with the advance of the movable spindle 50, the hook is turned downwardly in order to grip the folded parts of the ends of the binder applied to the end face of the sleeve 42, while after the knotting operation, the said spindle has turned through 180° so that the hook is pointed upwardly so as to ensure the free release of the knot.

It is also to be noted that the return of the movable spindle 50 is combined with a forward movement of the sleeve 42 in order to ensure a better pulling of the lengths of the binder.

This supplementary forward movement of the sleeve 42 is obtained by a modification of the profile of a groove 53² formed in a forward portion of the cam 53.

In order to understand these new movements of the knotting device, combined with those described in the previous embodiment, it is expedient to refer to the operation thereof, which is now explained in more detail.

The sleeve 42 is advanced for the bearing of the lengths L⁵ and L⁶ of the binder, appearing as indicated in FIG. 19 after the package has been encircled, the spindle 50 being in its retracted position. The rotatable knotting device 59 is then advanced and partially rotated (one revolution and a quarter) for the crossed winding of the said strands on the sleeve 42 and consequently the folding of the unwound section on the extreme transverse face of the sleeve 42. The movable spindle 50 which is fast with the hook, is then advanced so that the hook may occupy the lowered position for engaging the ends of the binder.

Next, the movable spindle 50, combined with the sleeve 42 is retracted for the ejection of the strands which are wound on the periphery of the sleeve 42 and which abut against the end 59 of the knotting device. The sleeve 42 is then again advanced the spindle 50 being retracted, for the pulling and formation of the knot. The sleeve 42 and also the rotatable knotting device 59, are then retracted, the device 59 continuing its rotation in order to ensure the opening of the engaging lever and the ejection of the knot. Finally, the movable spindle 50 is rotated and advanced in order to present the opening of its hook in an upward direction so as to facilitate the release of the knot.

It is also necessary to consider that provision is made for completely releasing the loop from the spindle 50 by increasing the retraction of the latter, so as to return by sliding movement the ends $L^5$ and $L^6$ from the opposite side of the binder which encircles the package.

In a further modified construction of the knotting unit which is illustrated in FIGS. 26 to 35, it is seen that a rectangular parallelepipedic housing 60 supports on its outer part a reduction motor unit 61 (FIG. 27), which drives a transverse shaft 62 mounted on ball bearings in a cage 63. The shaft 62 is secured to a cam disc 64, one side of which is formed or provided with a boss $64^1$ arcuately arranged for co-operation with a transverse finger 65 fixed on a pivotally mounted lever 66.

The lever 66 is arranged laterally and is pivotally mounted at its base on a shaft 67. Its upper portion is extended angularly and is formed with a toothed arcuate portion $66^1$ which meshes with the pinion 68 (FIG. 25) keyed on a hook-carrying movable spindle 69, so as to rotate the latter.

In addition to the cam disc 64, a shaft 62 also drives a ring 70, the periphery of which comprises two projecting and oppositely disposed tongues $70^1$ which are of arcuate shape and which form a locking means, as indicated in the remainder of the description of this embodiment. A frusto-conical pinion 71 is arranged parallel to the ring 70 and is mounted on the shaft 62 so as to co-operate with a controlled pinion or bevel gear wheel 72 which is orthogonally arranged with respect thereto and which is mounted on the end of a shaft 73 mounted in an adjacent side of the housing 60. A cylindrical pinion 74 is mounted for rotation with the shaft 73 and drives a toothed wheel 75 by means of an intermediate wheel 77, said toothed wheel 75 being keyed on the periphery of a rotatable knotting device 76 for providing the rotation thereof.

It is also to be noted that a projecting ring 78 is keyed onto the shaft 73, the ring 78 being formed on its periphery with a flat portion $78^1$ which is designed to co-operate with each of the tongues $70^1$ of the ring 70, in order to form a locking device, by stopping temporarily and blocking the rotation of the pinions 72 and 74.

For this purpose, the pinion 71 is appropriately formed with an interrupted toothed portion, thus forming two recessed toothless arcuate portions $71^1$ and $71^2$, which are free of the teeth of the pinion 72 while they are rotating, so as to ensure intermittent rotation of the pinion 72 in two cycles (in a given ratio), in combination with the locking thereof during the time it is immobilised.

When the sectors $71^1$ and $71^2$, which are in registry with the tongues $70^1$ of the ring 70, are respectively facing the toothing of the controlled pinion 72, the latter is stopped in its driving action and the corresponding tongues $70^1$, which are displaced with a circular movement because of their permanent engagement with the shaft 62, are positioned opposite one of the flat portions $78^1$, as illustrated in FIG. 29, thereby preventing any free rotation in one direction or other of the pinion 72, and as a consequence, any rotation of the rotatable knotting device 76.

When one of the toothed arcuate portions of the pinion 71 is meshing with the pinion 72, the corresponding tongue $70^1$ is free, because of its position, from one of the flat portions $78^1$ thus ensuring freedom of movement to the pinions when required.

It is also to be noted that the diameters of the pinions 71, 72, 74 and 75 are appropriately chosen so as to obtain, in a first cycle, a rotation of the knotting device 76 through three-quarters of a revolution, corresponding to the opening of a hook 79, and in a second cycle, a supplementary rotation of one and a quarter revolutions for the winding of the connecting strands, as indicated in the previous embodiments.

The shaft 62 is extended beyond the pinion 71 and is mounted at its end opposite the motor unit 61 in the end face of the casing or housing 60. Internally of the housing 60 and adjacent the side opposite the motor unit 61, there is mounted on the shaft 62 a cam disc 80 intended to control a cutting lever 81.

The lever 81 is pivoted at its base on a pivot pin 82 fixed in a transverse boss 83 (FIG. 28) formed at the bottom of the housing 60. The lever 81 has an upper portion in the form of an arm $81^1$ (FIG. 30) which is generally arcuate in shape and arranged to extend through a corresponding opening of the housing in order to project externally therefrom. A support 84 mounted on the free end of the arm $81^1$, is provided with a cutting blade 85 for the cutting of the binding strand on completion of the pivotal travel of the lever 81, as is indicated by the broken lines in FIG. 30.

For this purpose, the cam disc 80 is formed on its periphery with a concentric boss $80^1$ presenting sloping surfaces $80^2$ for co-operation with a rotatable roller 86 mounted transversely on the lever 81. A spring 87 ensures the return of the said lever 81.

The bottom of the housing 60 is also formed with parallel ribs 88 disposed perpendicularly with respect to the pivot pin 82. Between the ribs 88 there are mounted transverse shafts 89, 90 and 91, on which are freely journalled the cylindrical bases or hubs of corresponding pivotal levers 92, 93 and 94.

The lever 92 (FIG. 31) is pivoted on the shaft 89 and is made in the form of a fork for engaging between a cam 95 and a co-operating cam 96 arranged to permit its rocking movement in two directions. The cams 95 and 96 are keyed on the shaft 62.

To this end, the cam 95 is formed on its periphery with a concentric arcuate portion $95^1$ which merges at either end with two rounded portions $95^2$ and $95^3$ between which is a projecting and eccentric portion $95^4$. A roller 97 mounted transversely on the end of one of the arms of the lever 92 bears permanently on the contour of the said cam 95, while a second roller 98 mounted transversely on the opposite side of the lever 92 bears on the reverse and complementary contour of the co-operating cam 96. It is thus seen that the rotation of the coupled cam and co-operating cam 96 in the direction of the arrow $F^1$ (FIG. 31) ensures the angular displacement in both directions of the lever 92.

The other arm of the lever 92 is attached to a lug $99^1$ of a fork 99 which pivots freely about oppositely disposed fingers $100^1$ of a ring 100. The ring 100 is mounted to turn freely at the end of the rotatable knotting device 76.

This arrangement thus permits the combination of the rotational movement of the knotting device 76 produced by the pinions 72, 74, 75 and 77 with its longitudinal displacement by sliding on a tubular member 101 and by means of the lever 92.

The lever 93 pivoted on the shaft 90 is arranged to provide longitudinal displacement of the member 101 by means of a cam 102 (FIG. 32) and a co-operating cam 103, which are also keyed on the shaft 62. For this purpose, the cam 102 is formed on its periphery with an arcuate portion $102^1$ on either side of which are falling contour portions $102^2$ and $102^3$, which merge with a concentric projecting portion $102^4$. A roller 104, mounted transversely on the lever 93, bears on the periphery of the cam 102, while a second oppositely disposed roller 105 co-operates with the co-operating cam 103 which has a reverse and complementary contour.

It is seen that the rotation of the cam 102 and of the coupled co-operating cam 103 ensures the angular displacement of the lever 93 in two directions. By means of its projecting arm, the lever 93 is made fast with a lug $106^1$ of a fork 106 which is mounted for pivoting about the oppositely disposed projections $101^1$ of a flattened rear section of the member 101.

This arrangement thus permits only the longitudinal displacement of the member 101, which slides freely on the movable shaft 69.

Figure 34:
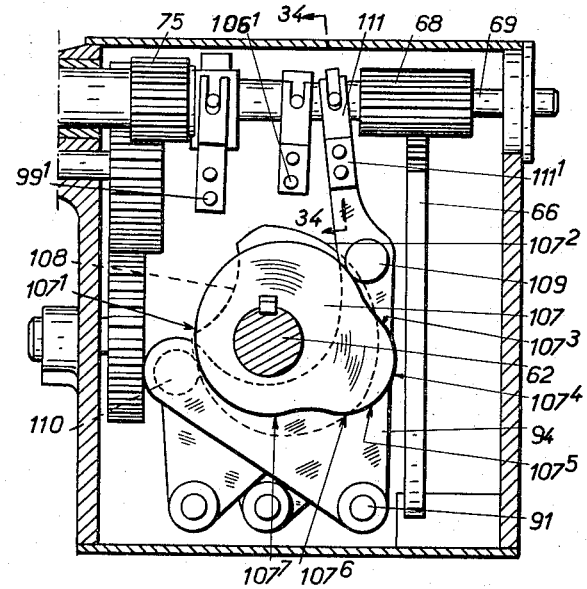
FIG. 34 is a section taken on the line 27d—27d of FIG. 27.
Figure 35:
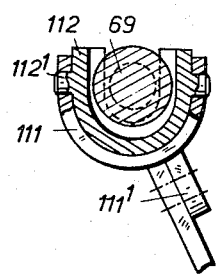
FIG. 35 is a sectional view, taken on the line 34—34, showing a detail of FIG. 34.

The lever 94 is pivoted on the shaft 91 and is arranged to provide longitudinal translatory movement of the movable spindle 69 by means of a cam 107 and a co-operating cam 108 both keyed on the shaft 62, as shown in FIG. 34.

The cam 107 is formed on its periphery with a concentric arcuate portion $107^1$, at one end of which is an eccentric rising portion $107^2$ which merges with a further rising portion $107^3$ of a concentric projection $107^4$. The projection $107^4$ is followed by three successive falling portions $107^5$, $107^6$ and $107^7$, the latter merging with the arcuate portion $107^1$. A roller 109 mounted transversely on the projecting arm of the lever 94, bears against the contour of the said cam 107, while a second, oppositely disposed roller 110 co-operates with the co-operating cam 108 which has a reverse and complementary contour, so as to cause the angular displacement of the said lever 94 in two directions.

By means of its projecting arm, the lever 94 is made fast with an angular lug $111^1$ fixed externally on a fork 111, which pivots on oppositely disposed fingers $112^1$ of a ring 112. The ring 112 is mounted to turn on the movable spindle 69.

This arrangement permits the combination of the rotational movement of the spindle 69, caused by the pivoting lever 66, with its longitudinal displacement by means of the lever 94.

It is to be noted that the parts which have not been described in relation to the embodiment illustrated in FIGS. 26 to 35 are the same as indicated in the previous embodiments. However, in connection with the embodiments of FIGS. 26 to 35, as described, it is expedient also to set out succinctly the different phases of the operation of the knotting device, namely:

The initial position is as illustrated in FIGS. 26 and 27. A hook 113 mounted at the end of the movable spindle 69 is outermost and its opening is pointing upwardly. The sleeve 101 is retracted, as is also the knotting device 76.

The bevel pinion 71 by means of its first arcuate toothed portion, rotates the pinion 72 and the knotting device 76 turns through three-quarters of a revolution in order to cause the opening of the gripper device 79.

The shaft 62 rotates the cam disc assembly and the member 101, urged by the projection $102^4$ of the cam 102, advances its maximum extent in order to receive the ends of the twine, binder or the like supplied by the gripper device.

The knotting device 76 advances by means of the cam 95 and the gripper device is closed on the two strands. The knotting device 76 turns through one and a quarter revolutions by the driving of the second toothed portion of the bevel pinion 71, in order to permit the winding of the twine around the member 101.

The movable spindle 69, which has turned through 180° by means of the pivoting lever 66 meshing with the pinion 68, also advances by the action of the projection $107^4$ of the cam 107, acting on the lever 94 in order to move the hook 113 and present its opening downwardly. The hook 113 takes up the lengths of twine or the like and then, by its return, moves them to the inside of the sleeve 101.

The sleeve 101 returns to the interior of the knotting device 76 and the two lengths of the twine fall.

The return movement of the hook end and the lengths of twine are cut by the pivoting of the cutting lever 81.

The sleeve 101 moves out again by the action of the falling portion $102^3$ of the cam 102 in order to block the knot and to return again to the interior of the knotting device 76.

The hook 113, fast with the shaft, moves out again, while turning, in order to raise the loop.

It must be considered that the knotting unit is inclined upwardly with respect to the supporting rollers in such a way as to come as close as possible to the package so as to obtain a maximum tightening effect.

I claim:
1. Apparatus for binding packages with an elongated binder, said apparatus comprising:
   a frame,
   support means for supporting packages to be bound,
   endless conveyor means arranged around said support means,
   gripper means mounted on said endless conveyor means for engaging a length of elongated binder,
   drive means for driving said endless conveyor means and said gripper means around a package located on said support means,
   guide means mounted on said frame for guiding said endless conveyor means around the package, and
   a knotter device operatively associated with said gripper means for knotting the binder subsequent to its guiding around the package, said gripper comprising:
      a first member mounted on said endless conveyor means,
      spigot means mounted on, and projecting from, said first member,
      a second member mounted for displacement longitudinally of said spigot means,
      stop means mounted on said spigot means, and
      resilient means mounted between said stop means and said second member for urging said second member towards said first member.

2. Apparatus according to claim 1, wherein said knotter device comprises:
   first sleeve means mounted for rotational and longitudinal movement,
   second sleeve means mounted within and for longitudinal displacement relative to said first sleeve means,
   a spindle mounted within and for longitudinal displacement relative to said second sleeve means,
   binder engaging means mounted at a forward end of said spindle, and
   lever means pivotally mounted on said first sleeve means and movable between a first position wherein a portion of said lever means moves towards said second sleeve means for engaging the elongated binder therebetween, and a second position wherein said portion of said lever means is remote from said second sleeve means.

3. Apparatus for binding packages with an elongated binder, said apparatus comprising:
   a frame,
   support means for supporting packages to be bound,
   endless chain conveyor means arranged around said support means,
   means mounted on said frame for tensioning said endless chain conveyor means,
   a supply of elongated binder, gripper means mounted on said endless chain conveyor means for engaging a free end of elongated binder from said supply thereof, drive means for driving said endless chain conveyor means and said gripper means around a package located on said support means, guide means mounted on said frame for guiding said endless chain conveyor means around the package, severing means for severing a length of elongated binder from said supply thereof, and a knotter device operatively associated with said gripper means for knotting said length of elongated binder subsequent to its guiding around the package.

4. Apparatus according to claim 3, wherein said gripper means comprises:

a first member mounted on said endless chain conveyor means, a second member mounted on and projecting from said first member for receiving said elongated binder from said supply, a third member pivotally mounted on said second member and formed with a crank portion for engaging said elongated binder on said second member, and resilient means mounted between said first and third members resiliently urging said crank portion of said third member towards said first member.

5. Apparatus according to claim 4, and including control means for controlling operation of said gripper means, said control means comprising a cam mounted on said frame, said third member of said gripper means being formed with a cam-engaging portion for operatively engaging said cam subsequent to knotting of said elongated binder by said knotter device.

6. Apparatus for binding packages with an elongated binder, said apparatus comprising:

a frame, support means for supporting packages to be bound, endless conveyor means arranged around said support means, a supply of elongated binder, gripper means mounted on said endless conveyor means for engaging a free end of elongated binder from said supply thereof, control means for controlling said gripper means, drive means for driving said endless conveyor means and said gripper means around a package located on said support means, guide means mounted on said frame for guiding said endless conveyor means around the package, severing means for severing a length of elongated binder from said supply thereof, and a knotter device operatively associated with said gripper means for knotting said length of elongated binder subsequent to its guiding around the package, said knotter device comprising first sleeve means mounted for longitudinal and rotational movement, second sleeve means mounted within said first sleeve means for longitudinal displacement relative thereto, a spindle mounted within and for rotational movement relative to, said second sleeve means, said spindle being formed at a forward end portion thereof with a recess defining a hook shaped portion, a member mounted for longitudinal displacement within said recess of said spindle, means resiliently urging said member towards the forward end of said hook shaped portion for engaging a portion of elongated binder between said member and said hook shaped portion of said spindle and for retaining said portion of said binder within said second sleeve means, and lever means pivotally mounted on said first sleeve means and movable between a first position wherein a portion of said lever means moves towards said second sleeve means for engaging the elongated binder therebetween, and a second position wherein said portion of said lever means is remote from said second sleeve means.

7. Apparatus according to claim 6, wherein said knotter device includes frame means for supporting said first sleeve means, a shaft mounted for rotation in said frame means, drive means for driving said shaft, gear means mounted on said shaft and operatively connected to said first sleeve means for imparting rotational movement thereto, first cam means mounted on said shaft and operatively connected to said first sleeve means for imparting longitudinal movement thereto, second cam means mounted on said shaft and operatively connected to said second sleeve means for imparting longitudinal movement thereto, and third cam means mounted on said shaft and operatively connected to said spindle for imparting rotational movement thereto.

8. Apparatus according to claim 7, wherein said knotter device includes frame means for supporting said first sleeve means, a first shaft mounted for rotation in said frame means, drive means for driving said first shaft, a second shaft mounted in said frame means for rotation about an axis disposed transversely of said first shaft, first gear means arranged on said second shaft, second gear means arranged on said first shaft for transmitting intermittent rotational movement to said first gear means, third gear means mounted on said second shaft for imparting rotational movement to said first sleeve means, first cam means mounted on said first shaft, severing means operatively connected to said first cam means for severing a length of elongated binder, second cam means mounted on said first shaft for imparting longitudinal movement to said first sleeve means, third cam means mounted on said first shaft for imparting longitudinal movement to said second sleeve means, and third cam means mounted on said first shaft for imparting longitudinal movement to said spindle.

9. In apparatus for binding packages with an elongated binder, a knotting device comprising:

frame means, first sleeve means mounted for rotational and longitudinal movement within said frame means, second sleeve means mounted within and for longitudinal displacement relative to said first sleeve means, a spindle mounted within and for longitudinal displacement relative to said second sleeve means, binder engaging means mounted at a forward end of said spindle, and lever means pivotally mounted on said first sleeve means and movable between a first position wherein a portion of said lever means moves towards said second sleeve means for engaging the elongated binder therebetween, and a second position wherein said portion of said lever means is remote from said second sleeve means.

10. A knotting device according to claim 9, and including a shaft mounted for rotation is said frame means, gear means mounted on said shaft for imparting intermittent rotation to said first sleeve means, first cam means mounted on said shaft for imparting longitudinal movement to said first sleeve means, second cam means mounted on said shaft for imparting longitudinal movement to said second sleeve means, and third cam means mounted on said shaft for imparting longitudinal movement to said spindle.

11. A knotting device according to claim 9, and including a first shaft mounted for rotation in said frame means, drive means for driving said first shaft, a second shaft mounted in said frame means for rotation about an axis disposed transversely of said first shaft, first gear means mounted on said second shaft, second gear means mounted on said first shaft for operative connection with said first gear means, said second gear means being arranged in two portions circumferentially spaced from one another for providing intermittent predetermined rotation to said first gear means, third gear means mounted on said second shaft for imparting rotational movement to said first sleeve means, first cam means mounted on said first shaft for imparting longitudinal movement to said first sleeve means, second cam means mounted on said first shaft for imparting longitudinal movement to said second sleeve means, third cam means mounted on said first shaft for imparting longitudinal movement to said spindle, and means operatively connected to said first shaft for imparting intermittent rotational movement to said spindle.

References Cited

UNITED STATES PATENTS

| | | | |
|---|---|---|---|
| 2,182,959 | 12/1939 | Burn | 289—2 |
| 3,102,467 | 9/1963 | Ainsworth et al. | 100—27 |

LOUIS K. RIMRODT, *Primary Examiner.*